United States Patent

[11] 3,587,972

| [72] | Inventor | Waldo W. Weeth |
| | | P.O. Box 924, Coalinga, Calif. 93210 |
| [21] | Appl. No. | 726,774 |
| [22] | Filed | May 6, 1968 |
| [45] | Patented | June 28, 1971 |

[54] IRRIGATION SYSTEM
4 Claims, 10 Drawing Figs.

[52] U.S. Cl. ................................................. 239/212, 239/229, 239/450
[51] Int. Cl. ........................................................ A01g 25/02
[50] Field of Search............................................ 239/266, 267, 268, 269, 450, 212, 198, 229, 452

[56] References Cited
UNITED STATES PATENTS

| 2,568,429 | 9/1951 | Burnam et al. ............... | 239/452 |
| 2,758,874 | 8/1956 | Snyder ......................... | 239/229 |
| 3,030,031 | 4/1962 | Barker.......................... | 239/229 |
| 3,150,830 | 9/1964 | Griffith......................... | 239/198 |
| 2,563,300 | 9/1948 | Aker .............................. | 239/269X |
| 3,091,401 | 5/1963 | Hruby, Jr...................... | 239/269X |
| 2,811,388 | 10/1957 | Calkins......................... | 239/269X |

Primary Examiner—Lloyd L. King
Assistant Examiner—John J. Love
Attorney—Mellin, Moore & Weissenberger ABSTRACT: An irrigation system having a plurality of flexible pipes leading from a main pipe into which water is pumped. Each flexible pipe has extending therefrom a plurality of hoses which are of such flexibility, inner diameter, and length that water flowing through the main pipe, through the flexible pipes, and through and from each of the hoses causes each hose to swirl in such a manner as to distribute water flowing therefrom over an area surrounding that hose. Each hose is provided with means which automatically stops the flow of air or water therethrough when air pressure or water pressure within the pipes falls below a specified level.

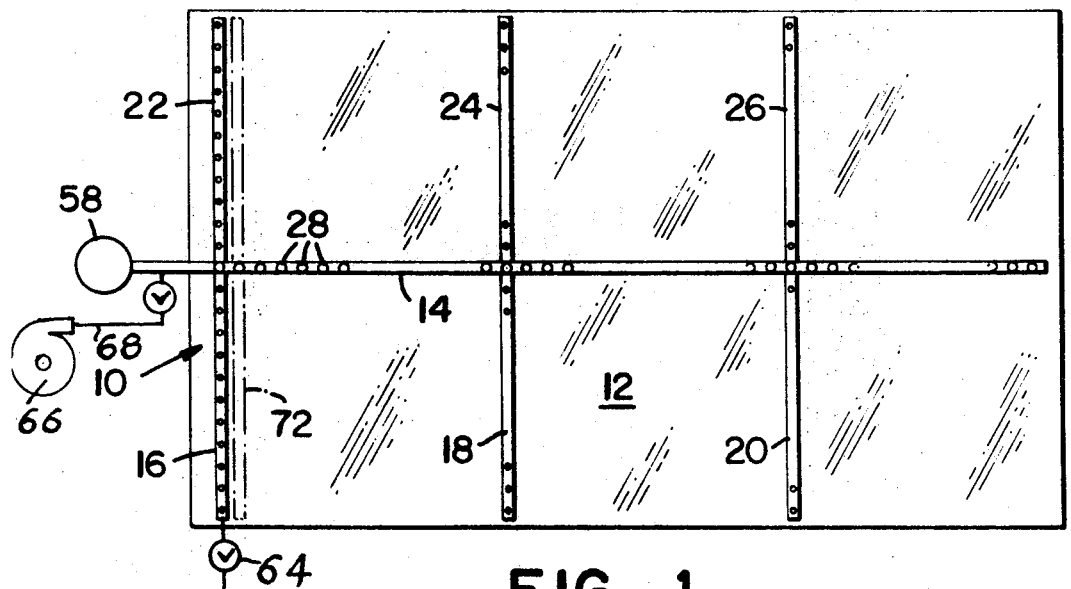
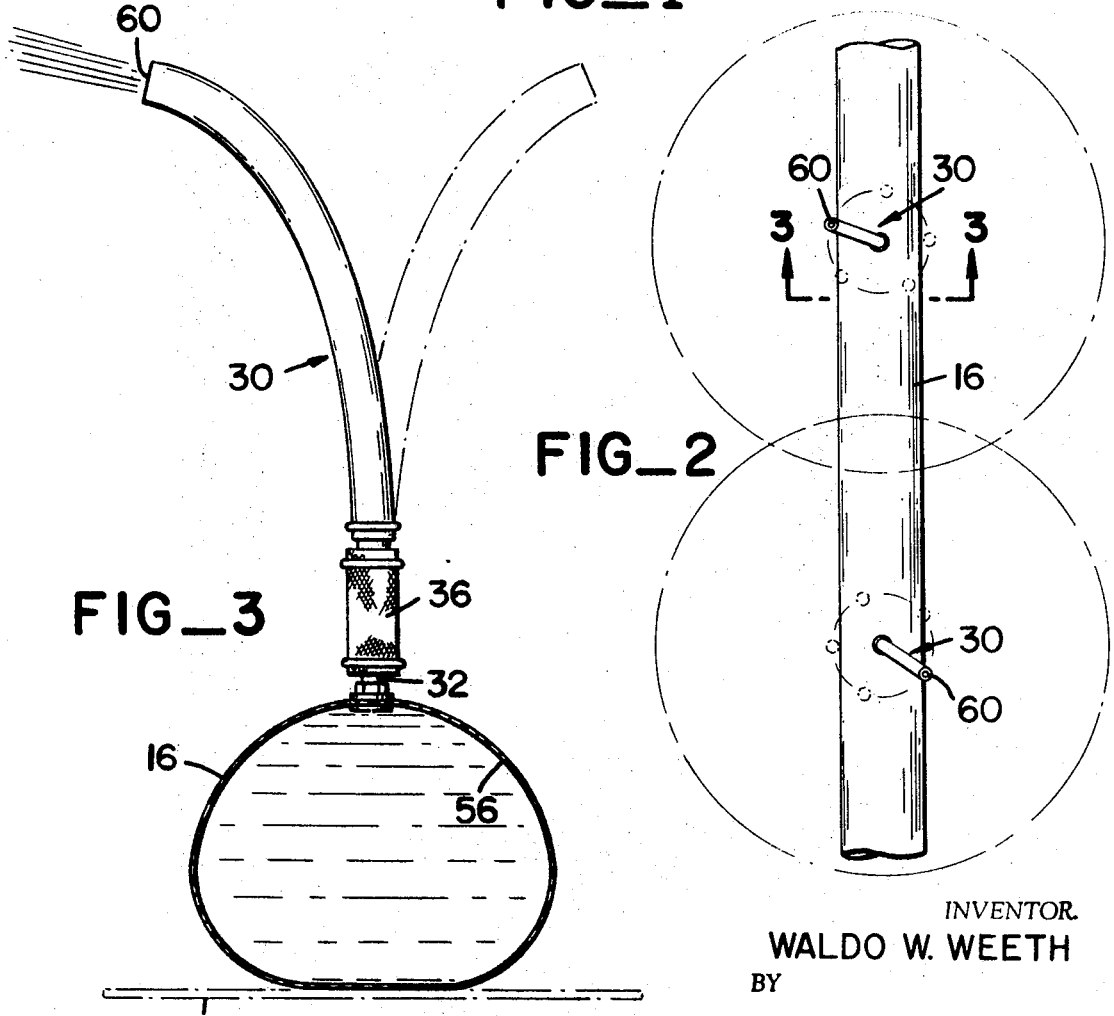

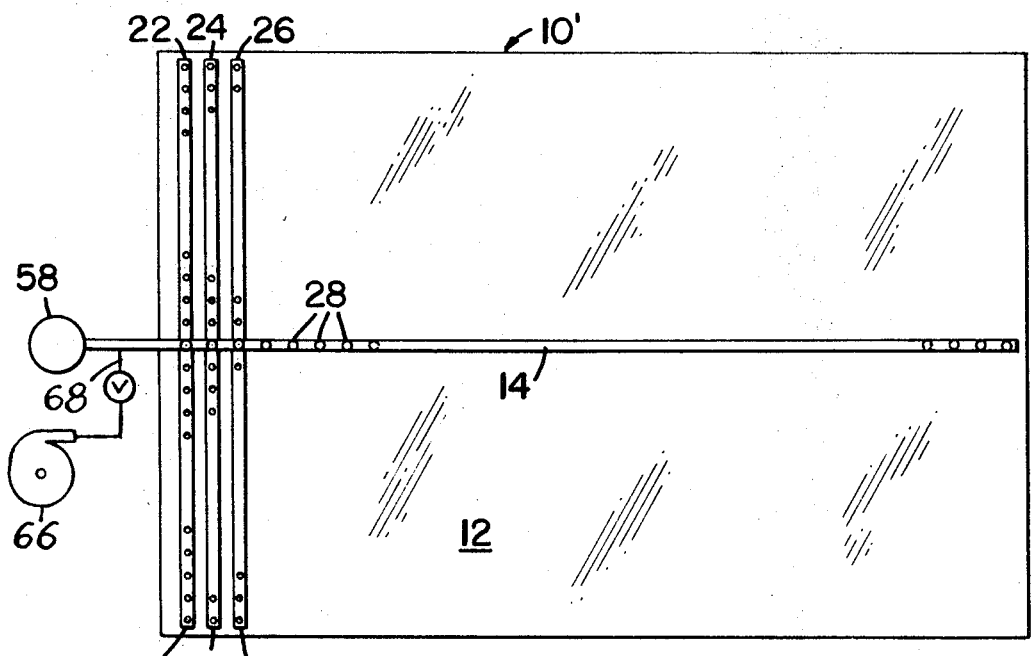
FIG_9
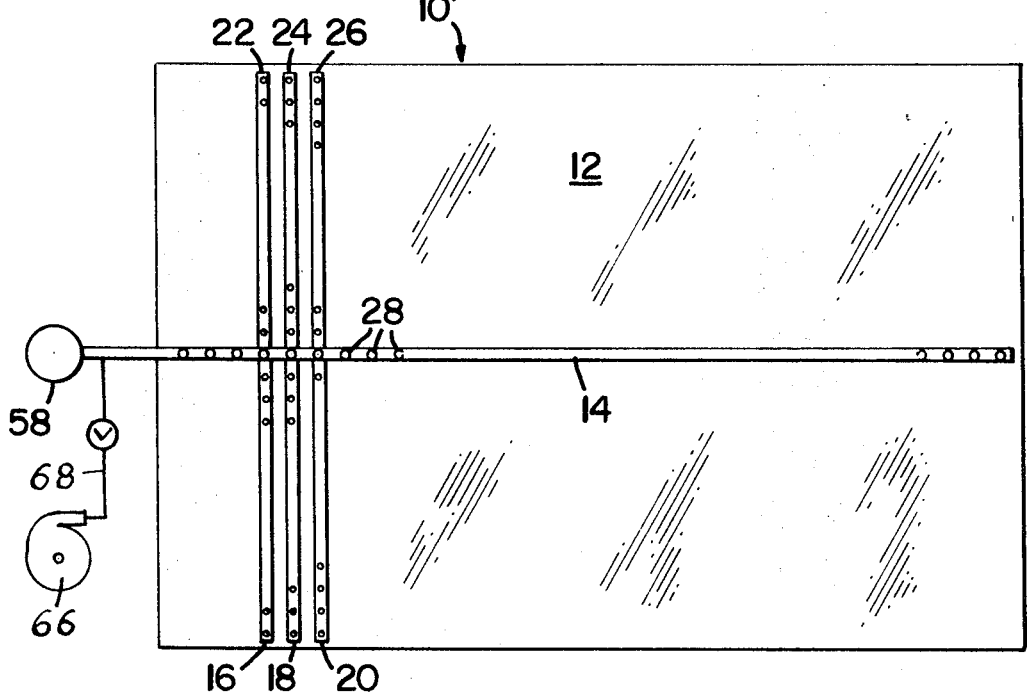
FIG_10

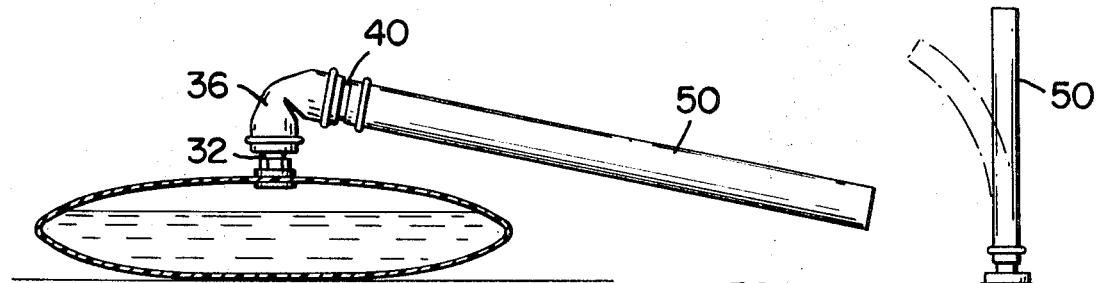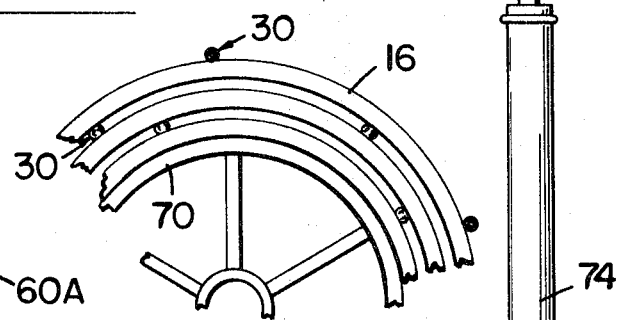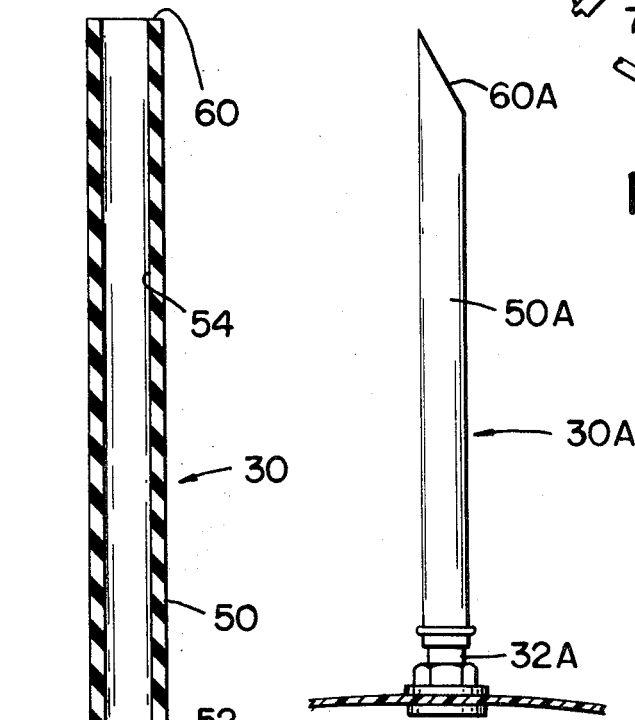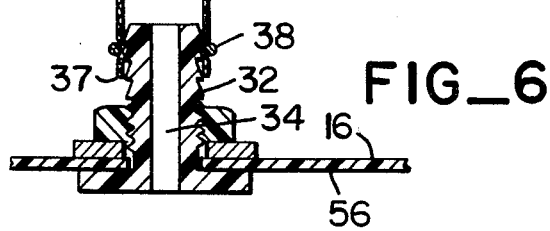

IRRIGATION SYSTEM

BACKGROUND OF THE INVENTION

This invention relates to irrigation systems, and more particularly to an irrigation system which provides flexible pipes through which water flows, and flexible nozzles disposed along each pipe.

In present irrigation systems, where a relatively large area (for example 160 acres) is to be watered, a rigid, long main line into which water is pumped is provided. The main line is provided with takeoff points along its length into which branch lines may be tapped. A number of branch lines extend laterally from the main line at spaced intervals along its length.

Generally, each of the branch lines is made of a plurality of rigid aluminum sections about 30 feet long which are coupled together to form a branch line perhaps 1320 feet long. A plurality of upright rigid nozzles are tapped into each branch line along its length, and the water pumped into the main line flows therethrough, through each branch line, and from each upright rigid nozzle, from which it is sprayed in a circular pattern.

After the ground area adjacent each branch line is sufficiently irrigated, the flow of water is cut off and each branch line along with its nozzles is moved a certain distance along the main line and tapped thereinto, so that another ground area may be irrigated. Since each branch line is of relatively great length and bulk, it is generally necessary to disassemble each one, move the individual sections thereof, and reassemble them into a long, continuous line. This process obviously requires a relatively great number of man-hours, and with the cost of farm labor continuously increasing, the irrigation of a substantial area of land by this method is a quite costly process. Furthermore, the structure itself is relatively complicated and costly. The pipe which makes up the branch line is relatively expensive and the upright nozzles generally including a mechanism for achieving an even spray pattern of water flowing therefrom, are themselves relatively quite complicated and costly. The problem is further complicated by the fact that these branch lines must be removed from an area which has just been irrigated, requiring that workers walk therealong through mud and freshly irrigated land.

It is an object of this invention to overcome the above problems by providing an irrigation system having branch lines which are capable of being easily reeled up at the main line and moved from one point along a main line to other points therealong so that a relatively larger ground area may be irrigated easily and conveniently.

It is a further object of this invention to provide a device which, along with fulfilling the previous object, utilizes extremely inexpensive branch line material, and which utilizes extremely simple, inexpensive and effective nozzles fixed to the branch lines which contribute to the ease of moving the branch lines along the main line.

SUMMARY OF THE INVENTION

Broadly stated, applicant's irrigating system comprises a longitudinal flexible pipe laid along the ground and a plurality of hoses disposed along the pipe, each having one end thereof fixed relative to the pipe body and communicating therewith, the body of each hose extending therefrom. Means are included for selectively supplying water under pressure into and through the longitudinal pipe and into the end of each hose fixed relative to the pipe body, the water flowing through each hose and from the extended end thereof. The cross-sectional area of each hose bore at the extended end thereof, the length of each hose, the flexibility of each hose, and the pressure urging the water are such that the extended end of each hose rotates at a substantially uniform circular velocity relative to its fixed end to spread the water flowing therefrom about the body of the hose.

BRIEF DESCRIPTION OF THE DRAWINGS

These and other objects of the invention will become apparent from a study of the following specification and drawings, in which:

FIG. 1 is a plan view of the irrigation system.

FIG. 2 is a fragmentary plan view of a lateral branch line of the system.

FIG. 3 is a sectional view taken along the lines 3-3 of FIG. 2, showing the operation of a nozzle under water pressure.

FIG. 4 is a view similar to FIG. 3 but showing the configuration of the nozzle when the water pressure has been cut off.

FIG. 5 is a fragmentary side elevation of a reel with the branch lines and nozzles wound therearound.

FIG. 6 is a sectional view of the nozzle shown in FIGS. 3 and 4.

FIG. 7 is a side elevation of a second embodiment of the nozzle.

FIG. 8 is a side elevation of a third embodiment of the nozzle.

FIG. 9 is a view similar to FIG. 1 but showing the branch lines in a different position.

FIG. 10 is a view similar to FIG. 9 but further along in the irrigating operation.

DESCRIPTION OF THE PREFERRED EMBODIMENTS

Referring to FIG. 1, there is shown therein applicant's irrigation system 10 for use in irrigating a large piece of ground 12, which may, of course, have growing thereon crops such as cotton, alfalfa, grain, tomatoes, lettuce, and so on. The system 10 is made up of a 10-inch diameter main line 14 of aluminum, and branch lines 16, 18, 20, 22, 24, 26 extending laterally therefrom. The main line 14 is provided with a plurality of takeoff points 28 spaced at intervals of approximately 50 feet along its length. The branch lines 16, 18, 20, 22, 24, 26 are connectable with any of these takeoff points 28 to tap into the main line 14.

Each of the branch lines, and structures associated therewith, are similar in construction and operation and, consequently, only branch line 16, and structure associated therewith, will be described in detail. Branch line 16 is made up of a number of flexible longitudinal sections of pipe (for example, molded nylon or fiber reinforced rubber hose) suitably coupled together. Branch line 16 has disposed along its length at intervals of about 25 feet a plurality of nozzles 30, one of which is shown in detail in FIG. 6. As shown therein, a base portion 32 is fixed to the branch line 16 and has an aperture 34 therein. A sleeve portion 36 has one end 37 fixed to the base portion 32 by means of a steel hose clamp 38 of the well-known variety. The sleeve portion 36 may be of any water proof material, such as canvas which is flexible and substantially nonresilient, and may with advantage have an inside diameter of three-eighths to one-half inch. A plastic insert 40 is fixed to the other end 42 of the sleeve portion 36 by means of a hose clamp 44 and has a bore 46 which may with advantage be tapered to form an orifice in the insert 40. One end 48 of a hose portion 50 is fixed to the plastic insert 40 by means of a hose clamp 52, and communicates with the end 42 of sleeve portion 36 through bore 46. The inner bore 54 of the hose portion 50 communicates with the inner bore 56 of pipe 16 through the sleeve portion 36 and the base portion aperture 34. The hose portion 50 is of flexible, substantially resilient material, such as substantially pure latex.

In operation, the branch lines 16, 18, 20, 22, 24, 26 are tapped into the main line 14 at selected takeoff points 28. Water is supplied under pressure of about 60—65 p.s.i. into main line 14, by means of pump 58. The water flows through the main line 14, and into and through each branch line 16, 18, 20, 22, 24, 26. The water flowing in branch line 16 passes through the nozzles 30 (FIGS. 2 and 3) and from the extended ends 60 thereof. The water pressure supplied to each nozzle 30 is sufficient to stiffen the sleeve portion 36 to hold the hose portion 50 substantially erect from the branch line 16, and to fix the end 48 of the hose portion 50 relative to the branch line 16.

It is to be noted with great importance that the cross-sectional area of the inner bore 54 at the extended end 60 of hose portion 50, the length of hose portion 50, and the flexibility of hose portion 50, and the water pressure are such that the extended end 60 of the hose portion 50 rotates at a substantially uniform circular velocity relative to its fixed end 48. The water flows from the extended end 60 of the hose portion in a pattern so as to be spread about the body of the hose portion 50 (FIGS. 2 and 3). Any of these parameters can, of course, be varied in proper relation to each other to achieve the same result. For example, the water pressure could be lowered and the hose 50 length increased. This would also result in a good distribution of water about the sprinkling means 30. The pressure supplied by pump 58 can of course be varied to achieve proper spread.

It has been found particularly advantageous for hose portion 50 to have a wall thickness within the range of from one-sixteenth inch to five thirty-second inch; to have an inner bore 54 of a diameter within the range of from three thirty-second inch to nine thirty-second inch; and to have an overall length within the range of from 5 inch to 7 inch, in conjunction with a water pressure within the branch line 16 in the range of from 35 to 45 p.s.i. The orifice defined by bore 46 in plastic insert 40 gives a definite flow through the nozzle 30 at various water pressures supplied thereto.

Numerous tests have been undertaken to determine the effect of varying the parameters described above. The following chart summarizes a portion of these tests.

tion whips excessively, and if the wall is too thick, not enough swirl takes place.

The extended end of the hose portion 50 may be cut so that it defines a plane, with the angle between the plane and the longitudinal axis of the hose portion in straightened configuration being approximately 90° (FIG. 6). The extended end of the hose portion 50 may alternatively be cut so that it defines a plane, with the angle between the plane and the longitudinal axis of the hose portion in straightened configuration being approximately 45° (60A of FIG. 8). If the length of the hose portion is cut accurately enough to its desired length, the 90° cut has proved completely satisfactory. However, in cases where the length is not perhaps as accurate as desired, satisfactory performance will generally be obtained by making a 45° cut.

After the ground adjacent each branch line 16, 18, 20, 22, 24, 26 has been watered sufficiently, each branch line, as 16, must be moved along the main line 14 and connected to another takeoff point 28. First, the supply of water is shut off, dropping the water pressure in branch line 16 (and all the other branch lines) to zero. Water, of course, still remains in branch line 16, and since branch line 16 may be 1320 feet long and have a diameter of 3 inches, it may hold approximately 2000 pounds of water therein, and may weigh approximately 500 pounds itself. Thus, before the branch line 16 can be handled easily, the water therein must be eliminated.

With the water pressure cut off, each nozzle 30 automatically bends under its own weight at sleeve portion 36 (FIG. 4). This is so because each sleeve portion 36, while being flexible, is substantially nonresilient, and does not tend to raise the noz-

| Size of end of orifice defined by bore 40, inch | Length of hose 50, inches | Bore 54 diameter of hose 50, inch | Wall thickness of hose 50, inch | Pressure supplied to nozzle 30, p.s.i. | Water flow- gallons per min. from nozzle 30 | Diameter of coverage, feet |
|---|---|---|---|---|---|---|
| ⅛ | 3⅝ | 3/16 | 3/32 | 30 | 3.28 | 36 |
|   |   |   |   | 35 | 3.47 | 38 |
|   |   |   |   | 40 | 3.47 | 38 |
| 9/64 | 3¾ | 3/16 | 3/32 | 30 | 3.19 | 38 |
|   |   |   |   | 35 | 3.37 | 38 |
|   |   |   |   | 40 | 3.56 | 38 |
| 5/32 | 3½ | 3/16 | 3/32 | 30 | 3.56 | 38 |
|   |   |   |   | 35 | 3.94 | 38 |
|   |   |   |   | 40 | 4.13 | 38 |
| 11/64 | 5¾ | ¼ | ⅛ | 35 | 5.63 | 40 |
|   |   |   |   | 40 | 6.00 | 42 |
|   |   |   |   | 45 | 6.38 | 42 |
| 3/16 | 5 | ¼ | ⅛ | 35 | 6.94 | 38 |
|   |   |   |   | 40 | 7.03 | 42 |
|   |   |   |   | 45 | 7.41 | 42 |
| 13/64 | 4¾ | ¼ | ⅛ | 35 | 7.41 | 40 |
|   |   |   |   | 40 | 7.97 | 42 |
|   |   |   |   | 45 | 8.34 | 42 |
| 7/32 | 4⅝ | ¼ | ⅛ | 35 | 7.78 | 42 |
|   |   |   |   | 40 | 8.34 | 42 |
|   |   |   |   | 45 | 8.81 | 42 |
| ¼ | 4½ | ¼ | ⅛ | 35 | 8.34 | 42 |
|   |   |   |   | 40 | 8.95 | 42 |
|   |   |   |   | 45 | 12.19 | 42 |
| 9/32 | 4½ | ¼ | ⅛ | 30 | 8.06 | 42 |
|   |   |   |   | 35 | 8.81 | 42 |
|   |   |   |   | 40 | 9.47 | 42 |
| 5/16 | 4¼ | ¼ | ⅛ | 30 | 8.16 | 40 |
|   |   |   |   | 35 | 8.91 | 42 |
|   |   |   |   | 40 | 9.75 | 42 |
| 11/32 | 4¼ | ¼ | ⅛ | 30 | 8.25 | 40 |
|   |   |   |   | 35 | 9.00 | 42 |
|   |   |   |   | 40 | 9.84 | 42 |
| ⅜ | 4¼ | ¼ | ⅛ | 30 | 8.25 | 40 |
|   |   |   |   | 35 | 9.00 | 42 |
|   |   |   |   | 40 | 9.84 | 42 |

Each nozzle 30 along each branch member 16, 18, 20, 22, 24, 26 operates in the same way to irrigate the ground area adjacent those branch members. Generally, a system 10 of the type described applies about 6 inches of water to the area being irrigated in 24 hours. Feet 62 may be provided along the branch line 16 (FIG. 2), and other branch lines, to insure that the nozzle 30 is held substantially erect when spraying water, so that even spread of the water takes place.

The parameters disclosed in the chart have proven quite satisfactory. Variance of any one parameter to any great extent results in less than satisfactory performance. For example, it has been found that if the wall is too thin, the hose porzle 30 erect to any great extent. This doubling over of sleeve portion 36 results in the inner bore 54 of the hose portion 50 no longer communicating with the inner bore of the branch line 16, i.e., it acts as an automatic valve which is now closed. The sprinkling means structure is arranged so that 12 to 15 p.s.i. of air or water in the branch line 16 to straighten the sleeve portion 36 sufficiently to allow passage of air or water therethrough.

Removal of the water in the branch line 16 is achieved by opening a stop gate 64 in the branch line 16 on its end opposite the main line 14, and utilizing means 66 for applying compressed air at about 10 p.s.i. through valved line 68 and main line 14 into the branch line 16. Such air pressure is sufficient to urge the water through and from the branch line 16, but falls short of the 12 to 15 p.s.i. required to straighten the sleeve portion 36 to allow passage of air therethrough. Each sprinkling means 30 along branch line 16 is thus effectively sealed, and the air cannot escape therethrough. Thus the air works on the water in the branch line 16 to urge it therethrough and from the opened stop gate 64.

The branch line 16 is now substantially empty, and each sprinkling means 30 thereon is folded over. The branch line 16 may be attached to a reel 70 and wound therearound, the power for example being supplied by the power takeoff shaft of a tractor or other vehicle. The body of the branch line 16 may be dragged along the ground by the reel 70 and wound therearound, the branch line 16 being uncoupled along its length and coupled to another reel when reel 70 is filled. Because the branch line 16 is flexible, and because the nozzles 30 are folded over and are of flexible material, the reeling in is accomplished with relative ease, and the branch line 16 and nozzles 30 thereon are put into a relatively neat package on a plurality of reels.

The branch line 16, on its reels, may then be easily and conveniently moved along the main line 14 and connected to another takeoff point 28. It may then be laid along the ground by transporting the reel and unwinding the branch line 16 therefrom during such transporting, until it occupies a position indicated as 72 in FIG. 1. Water under pressure may then be supplied to branch line 16 through main line 14, and the sprinkling means 30 will operate as described above to irrigate the ground adjacent the branch line 16 as it is now positioned. It will be understood, of course, that each branch line 18, 20, 22, 24, 26 may be reeled in and out and moved in the same manner as branch line 16. The system is particularly advantageous because vehicles and/or men need not travel through freshly irrigated ground, causing damage to it. This is so because of applicant's system of reeling which drags the branch lines.

It will be noted that, in certain situations, it may not be necessary to provide a sleeve portion 36 in a nozzle 30. Such a nozzle 30A is shown in FIG. 8. In such case, the hose body 50A is connected directly to the base portion 32A. Such a nozzle sprays water in the same manner as the embodiment 30, and can, of course, be used with a flexible branch line and reeled up with it, since its hose portion 50A is flexible.

It should also be noted that nozzle 30A could be substituted for the ordinary mechanical type of nozzle used in conjunction with the aluminum branch line of the prior art, with a substantial saving in money.

In cases where the water must be sprayed from a certain height above the ground because of the height of crops growing from the ground, a riser tube 74 (FIG. 7) may be interposed between the sleeve portion 36 and hose portion 50 of the embodiment of FIG. 6. The riser tube 74 raises the position of the hose portion 50, so that it sprays from a height above the height of the crops. The riser tube 74 is molded and reinforced, and is relatively rigid in comparison to the hose portion 50. The nozzle incorporating such a riser hose 74 otherwise operates in a manner identical to the embodiment 30.

In FIGS. 9 and 10 is shown an irrigation system 10 with the branch lines 16, 18, 20, 22, 24, 26 all positioned adjacent one end of the main line 14 when irrigation begins, rather than spaced along main line 14, as in FIG. 1. Irrigation takes place for the prescribed length of time with the branch lines 16, 18, 20, 22, 24, 26 in the positions shown in FIG. 9. They are then reeled in and moved to the positions shown in FIG. 10 by the procedure described above, wherein irrigation of another area takes place.

It will be seen that herein is provided and irrigation system having branch lines which are capable of being easily repositioned along a main line so that a relatively large ground area may be irrigated easily and conveniently. Both the systems of FIGS. 1, 9, and 10 have proved extremely advantageous over the prior art, with the system of FIGS. 9 and 10 requiring even less labor time than that of FIG. 1. It has been found that, in the system of FIGS. 9 and 10, the six lateral lines can be changed (FIG. 9 to FIG. 10) in about 2 hours, a substantial saving in time. Contributing to the ease of operation are the flexibility of each nozzle, and the flexible sleeve portions which act as valves, as described above.

Furthermore, the structure used, especially the nozzle, is extremely simple, inexpensive, and effective. The cost of the hose used for the hose portion is currently about $8.00 for 50 feet. The overall cost for each nozzle is less than $1.00, as compared to a cost of $5.25 for the rigid nozzle now used. The conventional nozzle is of bronze and has 19 moving parts. Applicant's nozzle has no moving parts. The conventional nozzle weighs 455 grams. Applicant's nozzle weight 24 grams, making it much easier to handle. None of the components is affected by relatively high or low temperatures or poor weather conditions. They are operable effectively over a wide range of water pressures. There is almost no wear throughout the system.

Obviously, the invention can be carried out in many different ways, of which the embodiments shown are merely illustrative. Therefore, I do not desire to be limited by those embodiments, but only by the following claims.

I claim:

1. A water sprinkling system comprising:
   a. a longitudinal, flexible pipe laid along the ground;
   b. a plurality of hoses disposed along the pipe, each having one end thereof fixed relative to the pipe body and communicating therewith, the body of each hose extending therefrom;
   c. means for selectively supplying water under pressure into and through the longitudinal pipe and into the end of each hose fixed relative to the pipe body, the water flowing through each hose and from the extended end thereof, the cross-sectional area of each hose bore at the extended end thereof, the length of each hose, the flexibility of each hose, and the pressure urging the water being such that the extended end of each hose rotates at a substantially uniform circular velocity relative to its fixed end to spread the water flowing therefrom about the body of the hose;
   d. means for selectively urging air into, through and from the longitudinal pipe and through each hose, and air-pressure-sensitive valve means associated with each hose for stopping flow of air therethrough when air pressure within the pipe is below a specified level greater than 0 p.s.i.

2. A water sprinkling system comprising:
   a. a longitudinal flexible pipe laid along the ground;
   b. a plurality of sprinkling means disposed along the pipe, each sprinkling means comprising:
      i. a base portion fixed to the pipe and having an aperture therein;
      ii. a flexible substantially nonresilient sleeve portion having one end fixed to the base portion;
      iii. a flexible, substantially resilient hose portion having one end thereof communicating with the other end of the sleeve portion, the inner bore of the hose portion communicating with the inner bore of the pipe through the sleeve portion and base portion aperture, the body of each hose portion extending from the pipe;
   c. means for selectively supplying water under pressure into and through the pipe, the water flowing through each hose portion and from the extended end thereof when under sufficient pressure, each sprinkling means being positioned to bend under its own weight at the flexible, substantially nonresilient sleeve portion when the water pressure is below a specified level, so that the inner bore of that hose portion no longer communicates with the inner bore of the pipe; and
   d. means for selectively supplying air under pressure into and through the pipe, each sprinkling means being positioned to bend under its own weight at the flexible, substantially nonresilient sleeve portion when the air pressure is below a specified level greater than 0 p.s.i. so that the inner bore of that hose portion no longer communicates with the inner bore of the pipe.

3. A water sprinkling system according to claim 2, wherein the water pressure supplied to each sprinkling means is sufficient to stiffen the flexible, nonresilient sleeve portion thereof to an extent to fix the one end of the hose portion thereof relative to the pipe, and wherein the cross-sectional area of the inner bore of each hose portion at its extended end, the length of each hose portion, the flexibility of each hose portion, and the water pressure are such that the extended end of each hose portion rotates at a substantially uniform circular velocity relative to its fixed end to spread the water flowing therefrom about the body of the hose portion.

4. Apparatus for use in a sprinkler system comprising:
a. a flexible, substantially resilient hose having a discharge end, the cross-sectional area of the hose bore at its discharge end, the length of said hose, and the flexibility of said hose being such that the discharge end of said hose will rotate at a substantially uniform circular velocity relative to its other end when water under a predetermined pressure flows through said hose;
b. a flexible, substantially nonresilient sleeve having one end thereof fixed to said other end of said hose, said sleeve having a length and cross-sectional area such that fluid flow therethrough is cut off when said sleeve is doubled over, said sleeve being sufficiently flexible that it will not by itself support said hose in upright position.